US006676229B1

(12) United States Patent
Marra et al.

(10) Patent No.: US 6,676,229 B1
(45) Date of Patent: Jan. 13, 2004

(54) INTERFACE SYSTEM FROM PNEUMATIC TO ELECTRICALLY-CONTROLLED PNEUMATIC BRAKE SYSTEMS

(75) Inventors: Jon M. Marra, Henderson, NY (US); James R. Truglio, Watertown, NY (US); Dale R. Stevens, Adams Center, NY (US); Bryan M. McLaughlin, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/318,267

(22) Filed: Dec. 13, 2002

(51) Int. Cl.[7] ................................................. B60J 13/00
(52) U.S. Cl. ............................................. 303/7; 303/86
(58) Field of Search ........................ 303/3, 15, 20, 303/28, 36, 37, 44, 66, 74, 77, 80, 86; 701/70

(56) References Cited

U.S. PATENT DOCUMENTS

| 4,316,640 A | | 2/1982 | Cripe | |
| 5,862,048 A | * | 1/1999 | Knight | 364/138 |
| 5,967,620 A | * | 10/1999 | Truglio et al. | 303/3 |
| 5,984,427 A | * | 11/1999 | Kettle, Jr. | 303/16 |
| 6,024,419 A | * | 2/2000 | Waldrop et al. | 303/3 |
| 6,098,006 A | * | 8/2000 | Sherwood et al. | 701/70 |
| 6,189,980 B1 | | 2/2001 | Kull | |
| 6,217,126 B1 | | 4/2001 | Kull | |
| 6,286,913 B1 | | 9/2001 | Mazur et al. | |
| 6,334,654 B1 | * | 1/2002 | Root et al. | 303/7 |
| 2002/0153766 A1 | | 10/2002 | Kettle, Jr. | |

* cited by examiner

Primary Examiner—Christopher P. Schwartz
(74) Attorney, Agent, or Firm—Barnes & Thornburg

(57) ABSTRACT

An interface system including locomotive and car electrical trainline terminals, locomotive and car brake pipe ports and a locomotive pressure supply port. A train brake pipe valve controls pressure on the train brake pipe port. A controller monitors pressure on the locomotive brake pipe port and controls the train brake pipe valve in response to pressure on the locomotive brake pipe port. The controller also provides ECP commands on the train electrical terminal in response to pressure on the locomotive brake pipe port and provides electrical power on the train terminal from the locomotive electrical trainline terminal. The car electrical terminal is connected to the ECP trainline for providing ECP commands and power to the ECP equipped train devices. The controller may also control an emergency valve to produce an emergency on the locomotive brake pipe port. A transition valve on the brake pipe port allows bi-directional connection of the interface system.

23 Claims, 2 Drawing Sheets

INTERFACE SYSTEM FROM PNEUMATIC TO ELECTRICALLY-CONTROLLED PNEUMATIC BRAKE SYSTEMS

BACKGROUND AND SUMMARY OF THE INVENTION

The present invention relates generally to railway pneumatic brake systems and, more specifically, to an interface between a pneumatic train brake control system and a train of electrically controlled pneumatic (ECP) brake equipped cars.

The freight train industry in the U.S. is transitioning from a completely pneumatically-controlled train to a train having ECP brake equipment on their cars. For the foreseeable future, not all locomotives will have the capability of interfacing with an ECP equipped train. They do not have the ability to provide the necessary power or electric control signals to the individual cars nor to control the brake pipe as required by the ECP cars. As presently configured, the train brake pipe is maintained at its charged value and is only used as a pneumatic back-up for failure of the ECP electrical control signals.

To meet this demand, various systems have been suggested. A limp-in control arrangement for ECP systems is described in U.S. Pat. No. 6,286,913. An interface which provides the appropriate level of power to the ECP trainline is described in U.S. Pat. No. 6,217,126. A locomotive to ECP brake conversion system which provides the appropriate power and control signals to the car trainline is described in U.S. Pat. No. 6,189,980.

The present interface system is an improvement over these prior systems and provides additional features. The interface system includes a locomotive electrical trainline terminal and a train electrical trainline terminal. It also includes locomotive and train brake pipe ports and a locomotive pressure supply port. A relay valve is responsive to a pilot signal for connecting the train brake pipe port to the supply port, atmosphere or lap. A controller monitors pressure on the locomotive brake pipe port and controls the pilot signal to the relay valve in response to pressure on the locomotive brake pipe port. The controller also provides ECP commands on the ECP trainline with the train electrical terminal in response to pressure on the locomotive brake pipe port and provides electrical power on the ECP trainline via the train electrical trainline terminal using input power from the locomotive electrical trainline terminal.

A first valve selectively connects the supply port as the pilot signal to the relay valve, and the relay valve compares the supply port's pressure to the train brake pipe's pressure. A second valve selectively connects the locomotive brake pipe port to and controls the first valve in response to a signal from the controller. The second valve connects atmosphere to and controls the first valve in response to an emergency signal from the controller or absence of a signal from the controller.

The controller may include a trainline communications controller and a trainline power source connected to the terminals. It may also include a communication node or other suitable interface for connecting the trainline communications controller to the portions of the controller monitoring the pressure and controlling the relay valve. The controller may, alternatively, include a car control device of an ECP brake control valve and a trainline power source connected to the terminals. It would also include a communication node or other suitable interface for connecting the car control device to the portions of the controller monitoring the pressure and controlling the relay valve.

The interface system may also comprise locomotive and train electrical trainline terminals, locomotive and train brake pipe ports and a locomotive pressure supply port. A train brake pipe valve is provided for controlling pressure on the locomotive train brake pipe ports. An emergency valve selectively connects the locomotive brake pipe port to atmosphere in response to an emergency signal. A controller monitors pressure on the locomotive brake pipe port and controls the train brake pipe valve in response to pressure on the locomotive brake pipe port. A controller also monitors pressure on the train brake pipe port and provides the emergency signal to the emergency valve in response to pressure on the train brake pipe port. The controller also provides ECP commands on the train electrical terminal in response to the pressure on the locomotive brake pipe port and provides electrical power on the train electrical trainline terminal from the locomotive electrical trainline terminal.

The controller monitors signals on the train trainline terminal and provides emergency signals to the emergency valve in response to one or more of penalty and emergency signals received on the train electrical trainline terminal. A first valve receives an electrical emergency signal from the controller and provides a pneumatic emergency signal to the emergency valve. A check valve connects the locomotive and train brake pipe ports for an emergency pressure on the train brake pipe port. A vent valve is also provided and is connected to and responsive to an emergency signal on the train's brake pipe port.

An interface system may also include locomotive and train electrical trainline terminals, locomotive and train brake pipe ports and a locomotive pressure supply port. A controller monitors pressure on the locomotive brake pipe port and controls pressure on the train brake pipe port in response to pressure on the locomotive brake pipe port. A controller also provides ECP commands on the train electrical trainline terminal in response to pressure on the locomotive brake pipe port and provides electrical power on the train electrical trainline terminal from the locomotive electrical trainline terminal. A pair of brake pipe connectors are provided, and a transition valve is provided for reversing the connection of the brake pipe connectors to the locomotive and train brake pipe ports.

The interface system may be mounted on a rail vehicle having two ends. Each end includes a locomotive electrical trainline connector and a train electrical trainline connector connected to the locomotive and train electrical trainline terminals, respectively. It would also include one of the brake pipe connectors connected to the transition valve and a supply connector connected to the supply port.

These and other aspects of the present invention will become apparent from the following detailed description of the invention, when considered in conjunction with accompanying drawings.

DETAILED DESCRIPTION OF THE PREFERRED EMBODIMENTS

Figure 1:
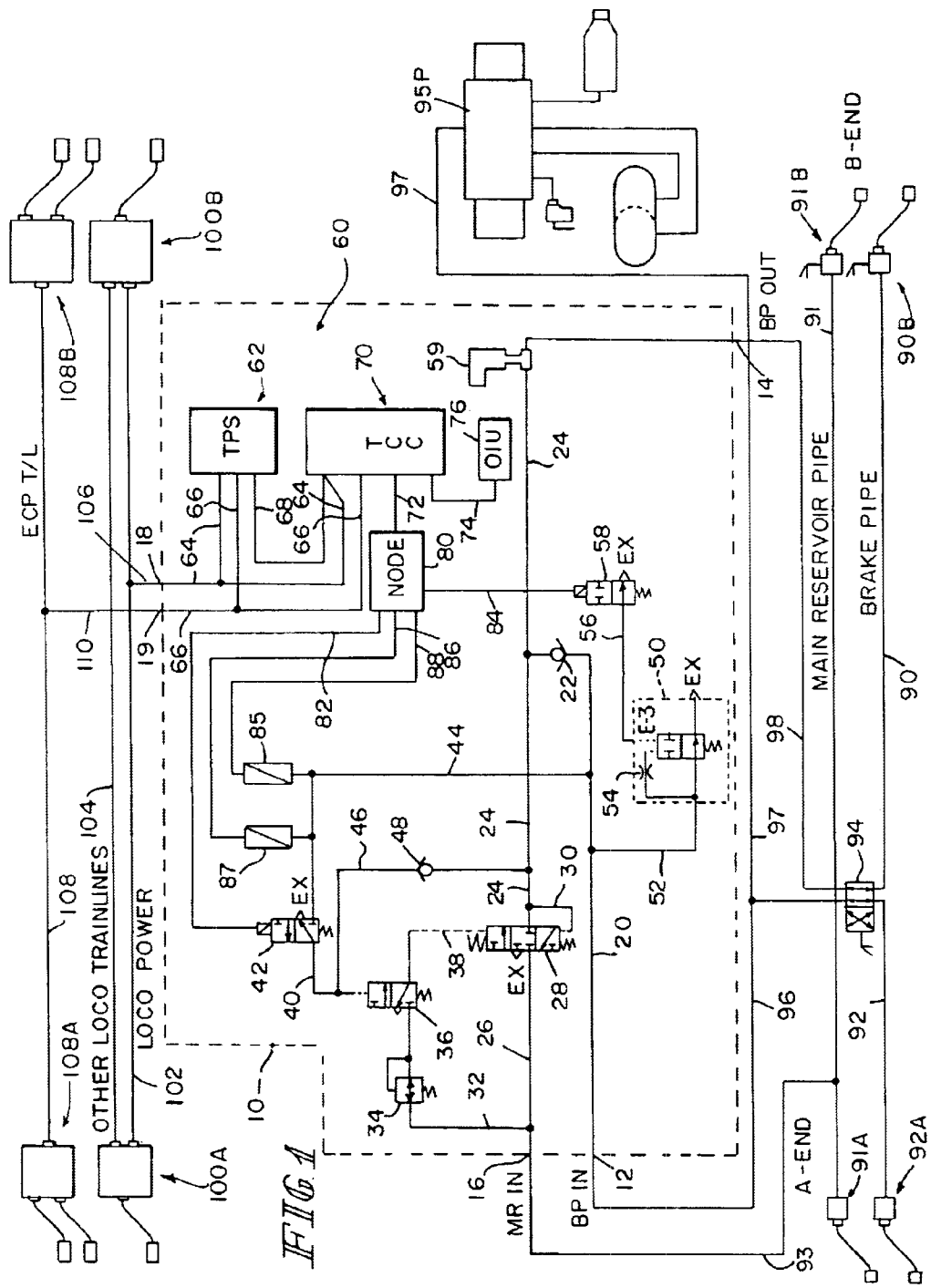
FIG. 1 is a schematic of a first embodiment of an interface system incorporating the principles of the present invention.

FIG. 1 illustrates an interface system 10 for interfacing a pneumatic train brake control system to a train of electrically-controlled pneumatic (ECP) brake equipped cars. The interface 10 includes a locomotive brake pipe port 12, a train brake pipe port 14, and a locomotive main reservoir pressure supply part 16. It also includes a locomotive electrical trainline terminal 18 and a train electrical trainline terminal 19. The interface system 10 monitors pressure on the locomotive brake pipe port 12 and controls the pressure on the train brake pipe port 14 in response to pressure on the locomotive brake pipe port 12. The interface 10 also provides ECP commands on the train electrical trainline terminal 19 in response to pressure on the locomotive brake pipe port 12 and provides electrical power on the train electrical trainline terminal 19 from the locomotive electrical trainline terminal 18.

By way of example, under the present systems approved for use in the United States, the input power at the locomotive electrical trainline terminal 18 is between 50–110 volts, and the output on the train electrical trainline terminal 19 nominally is 230 volts. Also, the ECP command signals provided at train electrical trainline terminal 19 include the required ECP trainline beacon and other control signals. Also, the interface 10 is capable of receiving ECP initiated penalties and emergencies from each of the ECP devices on the cars at electrical trainline terminal 19. The interface 10 is also capable of handling various ECP faults, including loss of end of train (EOT) beacon, low battery charge and critical loss, as reported by the various ECP systems throughout the train. Also, the interface 10 maintains the train brake pipe port 14 at a desired charged value during ECP operation as a standard in the industry.

The interface 10 can also provide a pneumatic redundancy for emergencies. Thus, if the locomotive brake pipe port 12 signals an emergency, interface 10 can execute an ECP commanded emergency and, if not sensed on the train brake pipe port 14, it can produce a pneumatic emergency condition on the train brake pipe port 14.

Figure 2:
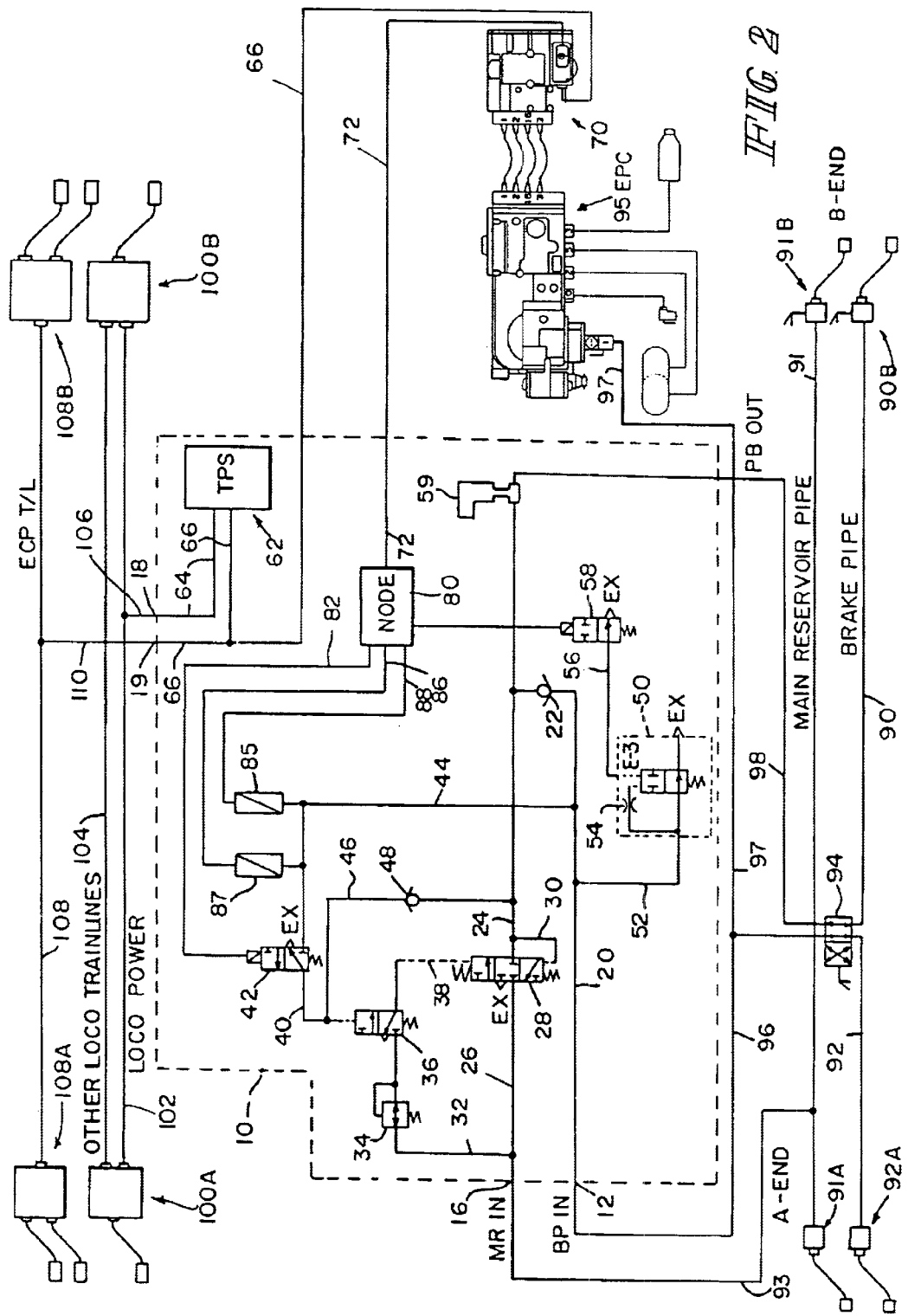
FIG. 2 is a schematic of a second embodiment of an interface system incorporating the principles of the present invention.

The details of two embodiments of the interface 10 which are capable of performing these functions are illustrated in FIGS. 1 and 2. Those elements that have a common function have common reference numbers.

Beginning in FIG. 1, the locomotive brake pipe port 12 is connected to the train brake pipe port 14 by line 20, check valve 22 and line 24. The locomotive supply port 16 is connected to line 24 by line 26 and a train brake pipe valve 28. The train brake pipe valve 28 is shown as a three-position relay valve in its lap position. The relay valve 28 compares the pressure on the train brake pipe line 24 via line 30 against the pilot signal on line 38. The pilot signal on 38 is provided from the locomotive supply port 16 via line 32, a feed or pressure regulating valve 34 and a valve 36. The valve 36 is controlled via a signal on line 40, which is connected to the locomotive brake pipe port 12 and line 20 via line 44 and electropneumatic valve 42. The electropneumatic valve 42 is electrically controlled to connect the pressure on the locomotive brake pipe port 12 to move valve 36 from its shown exhaust position to a through position. This allows the regulated pressure from the locomotive supply port 16 to be applied to line 38 to pilot the relay valve 28.

Once the train brake pipe port 14 pressure equals that from the regulator feed valve 34, the relay valve 28 maintains itself in the shown lap position. If the train brake pipe port 14 pressure is lower than that on line 38, the relay valve 28 will move downward and supply additional pressure from the locomotive supply port 16 until they are equal. Then, it will move back to the lap position. If the valve 42 is in the shown de-energized position, the control line 40 to valve 36 is connected to atmosphere, and valve 36 moves to the shown position. This connects line 38 to atmosphere and allows the relay valve 28 to move up connecting the train brake pipe port 14 to exhaust. This produces an emergency condition on train brake pipe port 14. Thus, the relay valve 28 can operate as a charging valve, as well as a pneumatic emergency valve.

The train brake pipe port 14 is also connected via line 24, check valve 48 and line 46 to the control input of valve 36. During charging, the check valve 48 is closed since the output of relay valve 28 is higher than the pressure on lines 46 and 40 (locomotive brake pipe port 12). If the pressure at the train brake pipe port 14, after changing, drops below that on lines 40 and 46, which is generally below the locomotive brake pipe port 12, check valve 48 will open. This would occur for an pneumatic emergency on the train brake pipe. This will decrease the signal on line 40 causing valve 36 to move to its shown position disconnecting the locomotive supply port 16 from the relay valve 28. This causes relay valve 28 to move up connecting the train brake pipe port 14 to atmosphere. This effectively disables the relay valve 28 and prevents the supply port 16 from attempting to charge the train brake pipe port 14 during a train pneumatic emergency. It also provides further acceleration of depleting the pressure to the train brake pipe port 14 and possibly accelerating the transmission of a pneumatic emergency through the train brake pipe port 14. A vent valve 59 is also connected to the train brake pipe port 14 to sense an emergency condition and accelerate the blow down of the car brake pipe port pressure.

Interface 10 also includes a locomotive emergency valve. This valve includes a pneumatic valve 50 connected to the locomotive brake pipe port 12 via lines 52 and 20. Valve 50 is shown connecting the locomotive brake pipe port 12 to exhaust. When the pressure in the locomotive brake pipe port 12 is high enough via line 54, valve 50 moves down disconnecting line 52 from exhaust. A second control signal on line 56 from electropneumatic valve 58 also controls the position of emergency valve 50. Valve 58 receives its signals from the controller 60 to connect and disconnect line 56 from exhaust. When activated, valve 58 moves down disconnecting line 56 from exhaust and allowing the pressure of the locomotive brake pipe port 12 via line 54 to control the emergency valve 50. When the controller 60 senses an emergency on the train brake pipe port 14 and at other times (ECP only emergencies), it deactivates valve 58 by connecting line 56 to exhaust. This causes emergency valve 50 to connect lines 52 and 20 and the locomotive brake pipe port 12 to exhaust. This causes an emergency condition at the locomotive brake pipe port 12. If the controller 60 should fail, valve 58 will assume this exhaust position producing an emergency condition. The controller 60 also initiates power (throttle) cut-off on the locomotive(s) in response to an emergency.

The controller 60 in FIG. 1 is illustrated as including a trainline power supply module 62 connected to the locomotive electrical trainline terminal 18 via wire 64 and to the train electrical trainline terminal 19 via wire 66. It also provides a connection via line 68 to a trainline communications controller 70. Trainline communications controller 70 is also connected to the locomotive electrical trainline terminal 18 via wire 64 and to the train electrical trainline terminal 19 via wire 66. The trainline power supply module 62 and the trainline communications controller 70 are products available from New York Air Brake Corporation. Similar equivalent systems may be used and are a part of the known control systems in the locomotive for the ECP brake systems in a train. These systems take power from the locomotive electrical trainline terminal 18 and provide power and control signals on the car electrical trainline terminal 19 and the ECP trainline 108. The trainline communications controller 70 monitors the pressure at the locomotive brake pipe port 12 via transducers 85 and 87 and provides electrical control of electropneumatic valves 42 and 58 and converts this pressure to ECP trainline brake commands.

In this embodiment an input/output node 80 is connected to the trainline communications controller 70 via line 72. The node 80 is connected to electropneumatic valve 42 via line 82 and to electropneumatic valve 58 via line 84. The node 80 is also connected to two transducers 85 and 87 via lines 86 and 88, respectively. The transducers 85 and 87 monitor the conditions in line 44, which is connected via line 20 to the locomotive brake pipe port 12. One of the transducers may be a pressure transducer while the other may be a flow transducer. This allows determining not only the pressure at the port but the rate of change of pressure. One or both of these may be an indication of an emergency signal at the locomotive brake supply port 16. Alternatively, the two transducers 85 and 87 may both be pressure sensors for redundancy in the event one fails. An operator interface unit 76 is connected via line 74 to the trainline communications controller 70. This provides an operator display for train set-up and other functions. Depending upon the type of modules 70 used, node 80 may be eliminated and the connection to module 70 be made direct.

FIGS. 1 and 2 illustrate the interface system 10 mounted to a car having an A-end and a B-end. This is by way of example, and the terminals and ports of the interface system 10 may be connected individually to the appropriate locomotive and car terminals and connectors. A first brake pipe portion 90 is connected to a B-end connector 90B, and a second brake pipe portion 92 is connected to an A-end connector 92A. A transition valve 94 allows reversing the connection of the brake pipe portions 90 and 92 to the locomotive brake pipe port 12 and the car/train brake pipe port 14 via lines 96 and 98, respectively. In the position shown for transition valve 94, the locomotive is at the A-end and its brake pipe connected at connector 92A, and the car at the B-end having its brake pipe connected to connector 90B. When the transition valve 94 is moved to the second position, the locomotive is at the B-end, and the car is at the A-end. The locomotive supply port 16 is connected to a supply line 91 having connectors 91A and 91B. As illustrated and known in the industry, this is the main reservoir pipe of a locomotive consist.

The car illustrated in FIG. 1 has a standard pneumatic or conventional brake control valve 95P. It is connected by line 97 to the locomotive brake pipe port 12 by line 96 downstream from switch 94. A standard pneumatic or conventional system 95P includes a pneumatic brake control valve, a pair of reservoirs, a retainer and a brake cylinder. All of these are shown but not marked, since they are well known. This provides a brake set on the car to which the interface system 10 is mounted.

For the electrical connections, electrical connectors 100A and 100B provide interconnection to the locomotive consist. Schematically, the locomotive power line 102 is shown, and the remainder of the locomotive trainlines are shown by a single line 104. These lines are the MU multi-unit lines well known in the freight industry. Locomotive power line 102 is connected via line 106 to the locomotive electrical trainline terminal 18 of the interface system 10. Train electrical trainline connectors 108A and 108B have an ECP trainline 108 therebetween to be connected to the train electrical trainline terminal 19. The ECP trainline 108 is connected via wire 110 to the train electrical trainline terminal 19.

FIG. 2 shows another embodiment of an interface system. Those elements having the same numbers are the same as that of FIG. 1 and have the same function. The major difference between FIG. 1 and FIG. 2 is that the controller 60 does not include the trainline communications controller 70. Also, the car brake system is an ECP brake system 95ECP. Such a system includes a car control device (CCD) 70', which has a lot of the same functions as the trainline communications controller 70. It is connected to and controls the pneumatic portion of the car brakes 95ECP. It communicates with the train electrical trainline terminal 19 and the other ECP CCDs through the train over line 66. It is also connected to the node 80 via wire 72. As is well known, the CCD 70' may have its own battery but receives its power from the trainline power supply 62 over line 66/108.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. An interface system for interfacing a pneumatic train brake control system to a train of electrically controlled pneumatic (ECP) brake equipped cars, the interface system comprising:

a locomotive electrical trainline terminal and a train electrical trainline terminal;

a locomotive brake pipe port, a locomotive pressure supply port and a train brake pipe port;

a relay valve responsive to a pilot signal for selectively connecting the car brake pipe port to the supply port, atmosphere or lap; and a controller monitoring pressure on the locomotive brake pipe port, controlling the pilot signal to the relay valve in response to the pressure on the locomotive brake pipe port, providing ECP commands on an ECP trainline via the train electrical terminal in response to the pressure on the locomotive brake pipe port, and providing electrical power on an ECP trainline via the train electrical trainline terminal from the locomotive electrical trainline terminal.

2. The system according to claim 1, including a first valve selectively connecting the supply port as the pilot signal to the relay valve, and the relay valve compares the supply port's pressure to the train brake pipe's pressure.

3. The system according to claim 2, including a second valve selectively connecting the locomotive brake pipe port to and controlling the first valve in response to a signal from the controller.

4. The system according to claim 3, wherein the second valve connects atmosphere to and controls the first valve in response to an emergency signal from the controller or absence of a signal from the controller.

5. The system according to claim 2, wherein the first valve provides atmosphere as the pilot signal to the relay in response to an emergency on the locomotive brake pipe port, and the relay valve connects the car brake pipe port to atmosphere in response to the atmosphere pilot signal.

6. The system according to claim 2, including a check valve connecting the locomotive and train brake pipe ports for an emergency pressure on the train brake pipe port, the first valve provides atmosphere as the pilot signal to the relay in response to the emergency pressure on either of the locomotive or train brake pipe port, and the relay valve connects the train brake pipe port to atmosphere in response to the atmosphere pilot signal.

7. The system according to claim 1, including a vent valve connected to and responsive to an emergency signal on the train brake pipe port.

8. The system according to claim 1, including an emergency valve selectively connecting the locomotive brake pipe port to atmosphere in response to an emergency signal, and the controller monitoring pressure on the train brake pipe port and providing the emergency signal to the emergency valve in response to pressure on the train brake pipe port.

9. The system according to claim 8, wherein the controller monitors signals on the train trainline terminal and provides the emergency signal to the emergency valve in response to one or more of penalty and emergency signals received on the train electrical terminal.

10. The system according to claim 8, including a third valve receiving an electrical emergency signal from the controller and providing a pneumatic emergency signal to the emergence valve.

11. The system according to claim 1, including a pneumatic brake control valve connected to the locomotive brake pipe port.

12. The system according to claim 1, wherein the controller includes a trainline communications controller, a trainline power source connected to the locomotive and train electrical terminals and an interference between the trainline communications controller and portions of the controller monitoring the pressure and controlling the relay valve.

13. The system according to claim 1, including an ECP brake control valve having a car control device; and the controller includes the car control device and a trainline power source connected to the terminals and a locomotive and train electrical interference between the car control device and portions of the controller monitoring the pressure and controlling the relay valve.

14. The system according to claim 1, including a pair of brake pipe connectors and a transition valve for reversing the connection of the brake pipe connectors to the locomotive and train brake pipe ports.

15. The system according to claim 1, wherein the system is mounted on a rail vehicle having two ends; and each end includes a locomotive electrical trainline connector and a train electrical trainline connector connected to the locomotive electrical trainline terminal and the train electrical trainline terminal, respectively, a brake pipe connector connected to one of the brake pipe ports, and a supply connector connected to the supply port.

16. The system according to claim 15, including a transition valve for reversing the connection of the brake pipe connectors to the locomotive and car brake pipe ports.

17. An interface system for interfacing a pneumatic train brake control system to a train of electrically controlled pneumatic (ECP) brake equipped cars, the interface system comprising:

a locomotive electrical trainline terminal and a train electrical trainline terminal;

a locomotive brake pipe port, a locomotive pressure supply port and a train brake pipe port;

a train brake pipe valve for controlling the pressure on the train brake pipe port;

an emergency valve selectively connecting the locomotive brake pipe port to atmosphere in response to an emergency signal; and a controller monitoring pressure on the locomotive brake pipe port, controlling the emergency valve in response to the pressure on the locomotive brake pipe port, monitoring pressure on the train brake pipe port, controlling the train brake pipe valve, providing the emergency signal to the emergency valve in response to pressure on the brake pipe port, providing ECP commands on the train electrical terminal to the train via an ECP trainline in response to the pressure on the locomotive brake pipe port, and providing electrical power on the ECP trainline via the train electrical trainline terminal from the locomotive electrical trainline terminal.

18. The system according to claim 17, wherein the controller monitors signals on the train trainline terminal and provides the emergency signal to the emergency valve in response to one or more of penalty and emergency signals received on the train electrical trainline terminal.

19. The system according to claim 17, including a first valve receiving an electrical emergency signal from the controller and providing a pneumatic emergency signal to the emergency valve.

20. The system according to claim 17, including a check valve connecting the locomotive and train brake pipe ports for an emergency pressure on the train brake pipe port.

21. The system according to claim 20, including a vent valve connected to and responsive to an emergency signal on the train brake pipe port.

22. An interface system for interfacing a pneumatic train brake control system to a train of electrically controlled pneumatic (ECP) brake equipped cars, the interface system comprising:

a locomotive electrical trainline terminal and a train electrical trainline terminal;

a locomotive brake pipe port, a locomotive pressure supply port and a car brake pipe port;

a controller monitoring pressure on the locomotive brake pipe port, controlling pressure on the train brake pipe port in response to the pressure on the locomotive brake pipe port, providing ECP commands on the ECP trainline via the train electrical terminal in response to the pressure on the locomotive brake pipe port, and providing electrical power on the ECP trainline via the train electrical trainline terminal from the locomotive electrical trainline terminal;

a pair of brake pipe connectors; and a transition valve for reversing the connection of the brake pipe connectors to the locomotive and train brake pipe ports.

23. The system according to claim 22, wherein the system is mounted on a rail vehicle having two ends; and each end includes a locomotive electrical trainline connector and a train electrical trainline connector connected to the locomotive electrical trainline terminal and the train electrical trainline terminal, respectively, one of the brake pipe connectors connected to the transition valve, and a supply connector connected to the supply port.

\* \* \* \* \*

UNITED STATES PATENT AND TRADEMARK OFFICE
CERTIFICATE OF CORRECTION

PATENT NO. : 6,676,229 B1
DATED : January 13, 2004
INVENTOR(S) : James R. Truglio et al.

It is certified that error appears in the above-identified patent and that said Letters Patent is hereby corrected as shown below:

Column 6,
Line 36, change "car" to "train"

Column 8,
Line 11, before "pressure" add -- the -- and before "brake" insert -- train --

Signed and Sealed this

Twenty-first Day of June, 2005

JON W. DUDAS
*Director of the United States Patent and Trademark Office*